United States Patent [19]
Bellenoue et al.

[11] Patent Number: 5,121,580
[45] Date of Patent: Jun. 16, 1992

[54] JIG ASSEMBLY FOR A TOOL SUPPORT

[75] Inventors: Serge M. Bellenoue, Presles; Didier C. Boisard, Epinay s/Seine; Philippe Krolik, Bobigny; Jean-Francois H. Richard, Epinay s/Seine; Hubert G. M. Rosin, Eragny s/Oise, all of France

[73] Assignee: Societe Nationale D'Etude et de Construction de Moteurs D'Aviation (S.N.E.C.M.A.), Paris, France

[21] Appl. No.: 652,627

[22] Filed: Feb. 8, 1991

[30] Foreign Application Priority Data

Feb. 9, 1990 [FR] France .............................. 90 01502

[51] Int. Cl.⁵ .............................................. B24B 9/00
[52] U.S. Cl. .................................... 51/166 TS; 51/99; 51/165.74; 409/234; 409/239
[58] Field of Search ............... 51/103 R, 103 WH, 99, 51/166 R, 166 TS, 168, 165 R, 165.74, 165.78, 165.81; 409/231-234, 238, 239, 199; 33/572, 626

[56] References Cited

U.S. PATENT DOCUMENTS 3,596,506  8/1971  Wilson .
4,266,373  5/1981  Bornefeld .............................. 51/99

FOREIGN PATENT DOCUMENTS 1001149  6/1957  Fed. Rep. of Germany .
1281303  10/1968  Fed. Rep. of Germany .
2449442  8/1982  France .
2639573  6/1990  France .
WO89/02810  4/1989  PCT Int'l Appl. .

OTHER PUBLICATIONS

Japanese Abstract-vol. 7, No. 47-Patent No. 57-194877 (Nov. 1982)-Inventor: Taiyou Chiyuuki K.K.
French Search Report Nov. 2, 1990.

Primary Examiner—Roscoe V. Parker
Attorney, Agent, or Firm—Bacon & Thomas

[57]  ABSTRACT

A jig assembly for mounting a tool is disclosed in which the tool is held generally stationary in the jig. The jig assembly is used in a machining process in which the workpiece is mounted at the end of a movable robot arm and is manipulated with respect to the generally stationary machine tool. The machine tool, which may be a rotating tool, is rotated about its longitudinal axis and the workpiece is manipulated by the robot arm so as to contact the rotating tool thereby enabling it to perform its machining function. The use of this jig enables the application of a substantially constant force between the workpiece and the rotating tool in order to machine each of the workpieces to very small tolerances. The tool holder is attached to a balance beam having balance weights attached to both ends. The beam pivots about a generally horizontal pivot axis extending generally through its midpoint. The tool holder is attached to the balance beam to pivot about this axis, which may also extend generally perpendicular to the rotational axis of the tool. Since the tool holder is pivotal about this axis, the tool may accommodate minute movement of the robot arm during the machining process and still maintain the close tolerances necessary for the finished workpiece. The balance weights on either end of the balance beam urge the beam and tool holder back into their equilibrium positions.

9 Claims, 2 Drawing Sheets

JIG ASSEMBLY FOR A TOOL SUPPORT

BACKGROUND OF THE INVENTION

The present invention relates to a jig assembly for mounting a tool for machining and/or finishing mechanical parts, more specifically such a jig intended for use with the workpiece supported on a robot.

It is known in the art to deburr or bevel the edges of mechanical workpieces using a movable robot arm to manipulate the workpiece and a tool holder assembly for holding the machine tool. French patent 2,639,573 discloses a typical example of such devices. The known devices utilize a flexible link between the movable robot arm and the tool holder thereby making it possible to control the forces applied to the workpiece by the tool and maintain such force substantially constant. This results in the machining of an edge contour that is substantially constant from one workpiece to the next.

It is also known to provide a robot arm that is statically balanced such that its control axes intersect at the center of gravity of the arm. A typical example is disclosed in PCT application number WO 89/02810.

SUMMARY OF THE INVENTION

A jig assembly for mounting a tool is disclosed in which the tool is held generally stationary in the jig. The jig assembly is used in a machining process in which the workpiece is mounted at the end of a movable robot arm and is manipulated with respect to the generally stationary machine tool. The machine tool, which may be a rotating tool, is rotated about its longitudinal axis and the workpiece is manipulated by the robot arm so as to contact the rotating tool thereby enabling it to perform its machining function.

The use of the jig according to the present invention enables the application of a substantially constant force between the workpiece and the rotating tool in order to machine each of the workpieces to very small tolerances.

The tool holder is attached to a balance beam having balance weights attached to both ends thereof. The beam pivots about a generally horizontal pivot axis extending generally through its midpoint. The tool holder is attached to the balance beam to pivot about this axis, which also may extend generally perpendicular to the rotational axis of the tool. Since the tool holder is pivotal about this axis, the tool may accommodate minute movement of the robot arm during the machining process and still maintain the close tolerances necessary for the finished workpiece. The balance weights on either end of the balance beam urge the beam and the tool holder back into their equilibrium positions.

The jig assembly according to the invention has proven to be particularly valuable in machining turbine blades and vanes for use in aeronautical gas turbine engines. Tools such as grinders and milling cutters may be utilized with the jig assembly according to this invention.

The jig assembly may also include a base and a frame member which pivotally supports the balance beam. Collar members may be attached to the base member to movably accommodate the balance weight supports in order to limit the effective movement of the balance beam. Stops may also be provided to physically limit the amount of pivoting movement of the balance beam.

DETAILED DESCRIPTION OF THE PREFERRED EMBODIMENT

Figure 1:
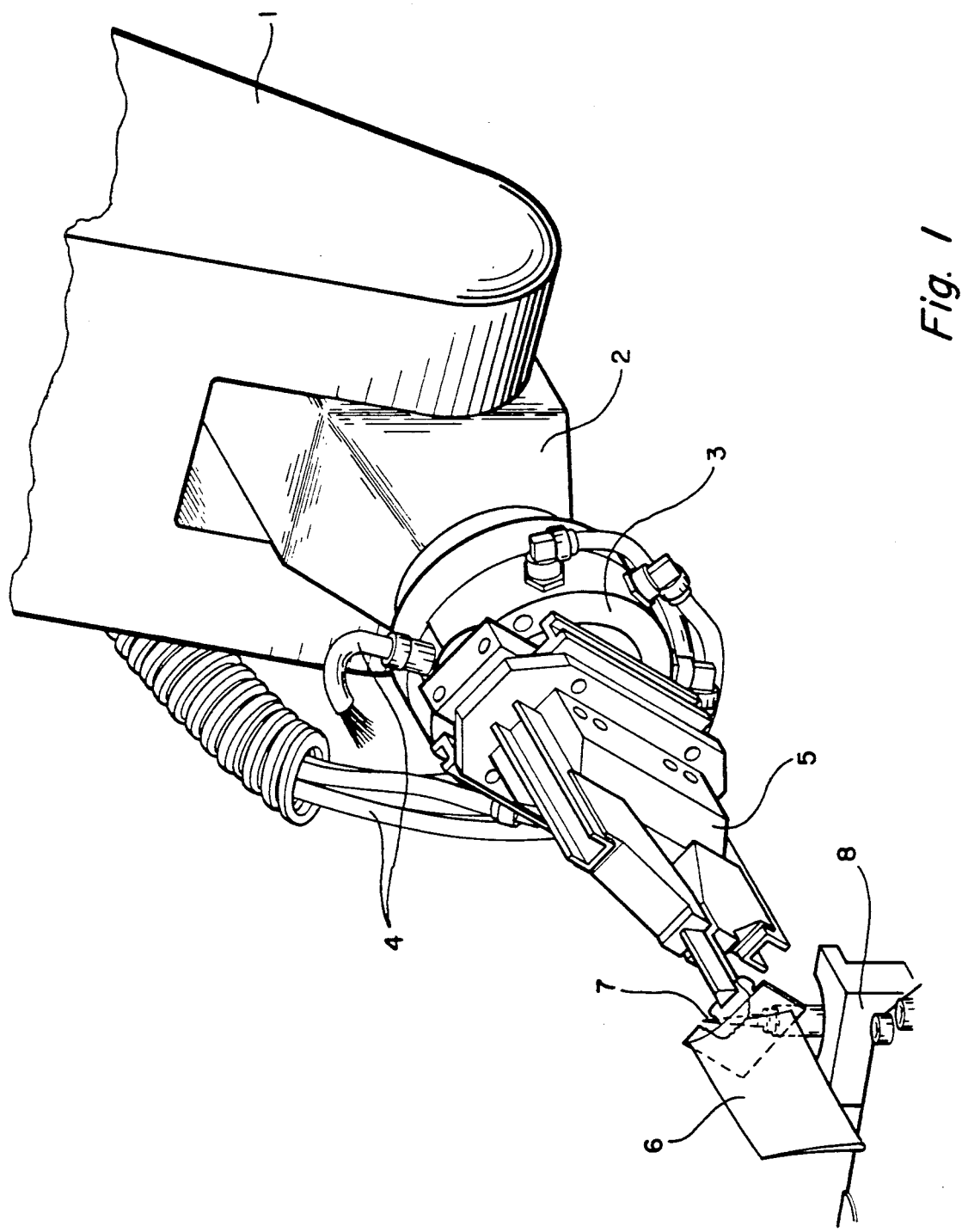
FIG. 1 is a perspective view of a known robot arm supporting a workpiece in machining position for use with the jig assembly according to the present invention.

As illustrated in FIG. 1, a robot arm may be employed to perform machining operations on various mechanical workpieces, such as turbine blades or vanes for use in aeronautical gas turbine engines. These workpieces must be machined to very high tolerances in order to perform their intended functions. An end portion of a known robot arm 1 includes a multi-hinge arm 2 in order to manipulate the workpiece through several degrees of freedom.

Figure 2:
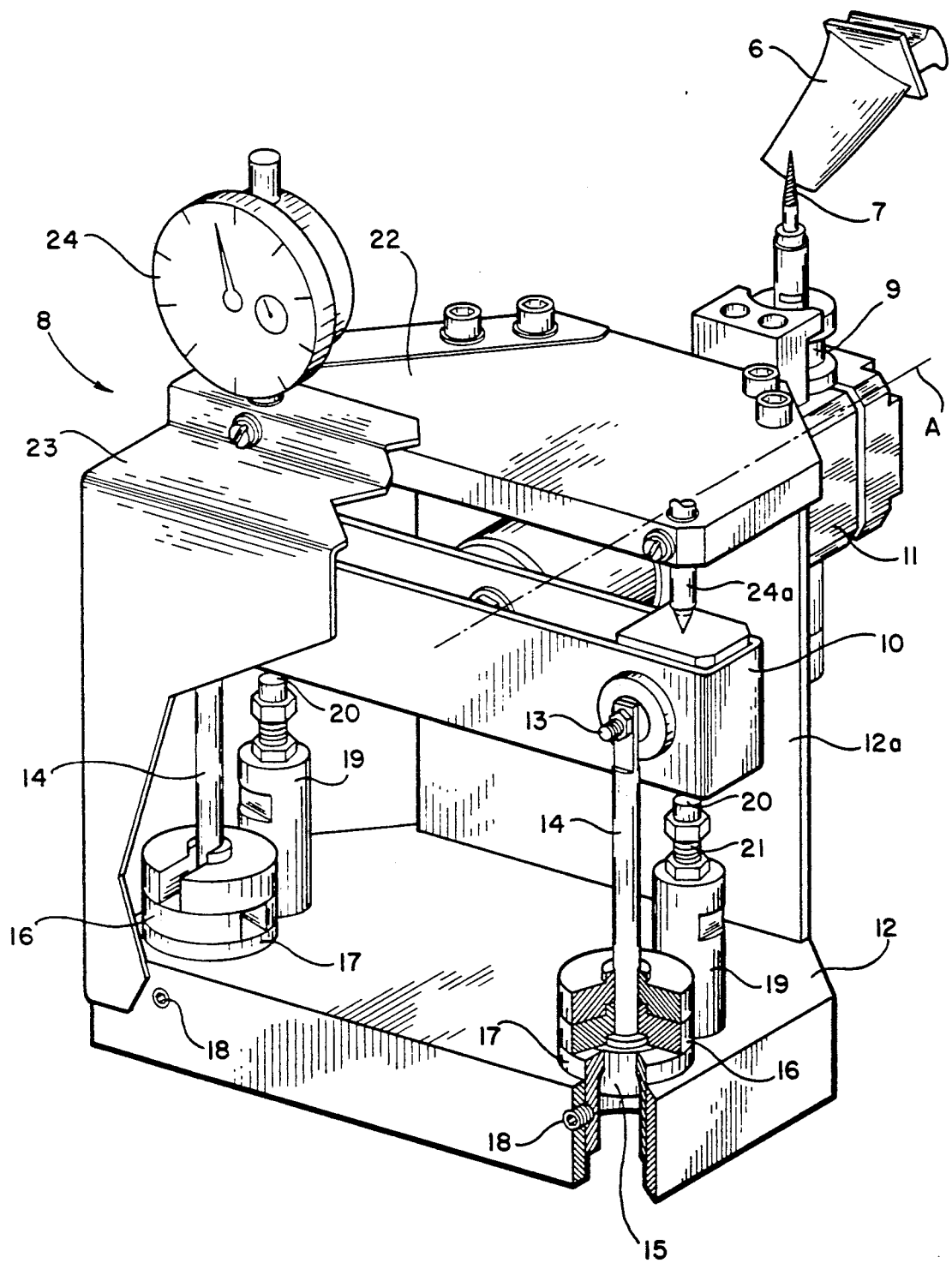
FIG. 2 is a perspective view, partially broken away, illustrating the jig assembly according to the present invention.

The end 3 of the robot arm 1 may be constrained to follow a path in the space defined by the robot control means, which have been omitted from this drawing. Known links 4 couple the end of the robot arm to power sources, such as electrical power sources, hydraulic power sources, or the like. The end 3 of the robot arm is provided with gripping means 5 in order to grip the workpiece 6. The robot arm manipulates the workpiece 6 against a rotating tool 7, such as a grinding or cutter tool, to perform the requisite machining operations. The rotating tool 7 is attached to a jig assembly 8 which is the subject of this invention and which is illustrated in FIG. 2. It is to be understood that the robot arm, per se, forms no part of this invention and any such known robot arm may be utilized with this invention.

The jig assembly 8 according to the present invention has a known tool holder 9 which holds or mounts the tool 7 such that it may rotate about its longitudinal axis. The jig assembly also comprises a tipping assembly which may consist of a balance beam 10 that is pivotable about a generally horizontal axis A which extends generally perpendicular to the plane of the balance beam 10 and extends generally through its mid-point.

The tool holder 9 is attached to the balance beam 10 via connecting assembly 11 which extends generally along the axis A.

The balance beam is pivotally supported on a base 12 by a frame member 12a which extends generally upwardly from the base member 12.

A rod member 14 is pivotally attached to each end of the balance beam 10 by a hinge pivot support 13. A balance weight support member 15 is located on the distal ends of the vertical rods 14 and serves to support one or more balance weights 16 on the rod members 14.

The base member 12 defines openings generally aligned with the rod members 14 into which openings are threaded collar members 17. The threaded interconnection between the collar members 17 and the base 12 enables the height of the upper surfaces of the collar members 17 to be adjusted. Set screw 18 extends through a portion of the base member 12 and contacts each collar member 17 to lock the collar member 17 in its adjusted position. As can be seen, the collar members 17 limit the effective travel of the balance beam 10 from its equilibrium position. Once the balance weights 16 of the lower rod member 14 contact the upper surface of the collar members 17, the opposite balance weights will tend to return the arm to its equilibrium position. Collar members define a central opening to movably accommodate balance weight support members 15 without affecting pivoting movement of the balance beam 10.

Stop members 19 may also be associated with the base member 12 and extend upwardly therefrom in order to physically limit the amount of pivoting movement of the balance beam 10. The stop members 19 are located such that stop portion 20 will contact the underside of the balance beam 10 to thereby limit its movement. The vertical position of the stops 20 may be adjusted by threaded portion 21. By turning this portion relative to the stop supports 19, the vertical position of the stops 20 may be raised or lowered.

The jig assembly 8 may also comprise an upper plate 22 as well as a cover 23 which would enclose the internal components of the assembly. Indicating devices, such as indicators 24, may be attached to the upper plate 22 and may have their actuating rods 24a extending to the interior of the jig to contact an upper portion of the balance beam 10, thereby providing a visual indication of movement of the balance beam. Indicating devices 24 may comprise dial indicators as illustrated.

When the rotating tool 7 is contacted by a workpiece manipulated by the robot arm, the pivoting motion of the balance beam 10 about the horizontal axis A will enable the tool 7 to move along an arcuate path having its center on horizontal axis A in a direction corresponding to the movement of the robot arm. Equilibrium of the balance beam 10 is preserved by the action of the balancing weights 16 such that a substantially constant force is exerted between the rotating tool 7 and the workpiece 6 during the machining operation. It has been found that the use of the jig assembly according to the present invention enables the machining of the workpieces 6 to a tolerance range of 0.4 mm, whereas the known devices the tolerance range was as high as 2 mm.

The foregoing description is provided for illustrative purposes only and should not be construed as in any way limiting this invention, the scope of which is defined solely by the appended claims.

We claim:

1. A jig assembly for mounting a tool such that the tool exerts a substantially constant force on a workpiece placed against the tool comprising:
   a) tool holder means to operatively hold the tool;
   b) a balance beam having opposite ends;
   c) means to support the balance beam such that it pivots about a pivot axis extending generally perpendicular to the balance beam and passing through the approximate mid-point of the balance beam;
   d) means interconnecting the tool holder means and the balance beam such that the contact force between the workpiece and the tool above a predetermined amount will cause the balance beam to pivot about the pivot axis; and,
   e) balance weight means operatively associated with the balance beam to maintain the equilibrium of the balance beam about the pivot axis.

2. The jig assembly of claim 1 wherein the means to support the balance beam comprises:
   a) a base member;
   b) a frame member extending upwardly from the base member;
   c) pivot means pivotally supporting the balance beam on the frame member.

3. The jig assembly of claim 2 wherein the balance weight means comprises:
   a) rod members each having a first and second ends;
   b) attachment means pivotally attaching a first end of a rod member to the balance beam; and
   c) balance weight support means located on the second ends of the rod members and adapted to support balance weights on each rod member.

4. The jig assembly of claim 3 further comprising means to limit the pivoting movement of the balance beam.

5. The jig assembly of claim 4 wherein the means to limit pivoting movement of the balance beam comprises:
   a) openings defined by the base member;
   b) a collar member located in each of the openings and defining an opening therethrough to movably accommodate the balance weight support means; and,
   c) means to attach the collar members to the base member.

6. The jig assembly of claim 5 wherein the means to attach the collar members to the base member comprises:
   a) threads formed on the base member in the openings;
   b) corresponding threads formed on the collar member such that a collar member may be threadingly engaged with the base member; and,
   c) set screw means extending through the base member into contact with the collar member to lock the collar member in a desired position.

7. The jig assembly of claim 5 wherein the means to limit the pivoting movement of the balance beam further comprises adjustable stop means extending from the base member and located so as to contact the balance beam thereby defining the limits of travel of the balance beam.

8. The jig assembly of claim 1 further comprising indicator means operatively associated with the balance beam to indicate pivoting movement of the balance beam.

9. The jig assembly of claim 8 wherein the indicator means are visual indicators.

* * * * *